United States Patent [19]

Taylor

[11] Patent Number: 4,809,333

[45] Date of Patent: Feb. 28, 1989

[54] METHOD AND APPARATUS FOR RECOGNIZING SPOKEN STATEMENTS BY USE OF A SEPARATE GROUP OF WORD STORES FOR EACH STATEMENT

[75] Inventor: Michael R. Taylor, Swindon, England

[73] Assignee: Smiths Industries Public Limited Company, London, England

[21] Appl. No.: 41,270

[22] Filed: Apr. 22, 1987

[30] Foreign Application Priority Data

May 2, 1986 [GB] United Kingdom ................ 8610809

[51] Int. Cl.⁴ .............................................. G10L 5/00
[52] U.S. Cl. ................................................... 381/43
[58] Field of Search ................................. 381/41–46, 381/110; 364/513.5; 367/198

[56] References Cited

U.S. PATENT DOCUMENTS 4,119,946  10/1978  Taylor ............................... 340/146.3
4,277,644  7/1981   Levinson et al. ................. 364/513.5
4,286,115  8/1981   Sakoe .................................... 381/43

OTHER PUBLICATIONS

"Machines You Can Talk To", by J. W. Glenn, Machine Design, vol. 47, No. 11, May 1975, pp. 72–75.

Primary Examiner—Emanuel S. Kemeny
Assistant Examiner—John A. Merecki
Attorney, Agent, or Firm—Pollock, Vande Sande and Priddy

[57] ABSTRACT

A sequence of spoken words are recognized as a unique pre-defined statement even though the order of some or all of the words may be interchanged when spoken.

7 Claims, 2 Drawing Sheets

METHOD AND APPARATUS FOR RECOGNIZING SPOKEN STATEMENTS BY USE OF A SEPARATE GROUP OF WORD STORES FOR EACH STATEMENT

BACKGROUND OF THE INVENTION

This invention relates to speech recognition apparatus and methods.

In conventional apparatus, the processing facilities required is reduced and the speed of operation is increased by syntax selection. The apparatus is programmed to recognize first only a preselected number of words in a first group which are the words that the speaker would speak first in making any of the commands for which the apparatus is programmed. After recognition of the first word, the apparatus is programmed to recognize only a preselected number of words in a second group which may, but need not always be different from the first group, the second group of words being those which the speaker would, in correct usage, speak after the first. The recognition of a string of words making up a command thereby proceeds step-by-step in this way, with each successive word being identified from a limited group of words which the apparatus is programmed to expect the speaker to use at that point in the string. In this way, the vocabulary with which the apparatus compares a spoken word at any point in the string can be reduced, leading to a more rapid identification and a reduction in processing capacity.

While syntax selection may work satisfactorily when the speaker speaks each word in the order programmed in the apparatus and without repetition, it may break down if the speaker does not follow the prescribed procedure. It is fairly common for a speaker to be interrupted while speaking a command and, when resuming the command or dialogue, to repeat one or more words already spoken. Also, the speaker may contravene grammar and, or alternatively, syntax rules formulated for a precise written language. Where syntax selection is used, the recognition of a word when it is spoken for a first time will cause the apparatus to move onto the next succeeding step in the recognition process and will change the stored vocabulary with which the spoken words are compared. This new group of words in the stored vocabulary will not generally contain any of the words in the preceding group so the apparatus will fail to recognize the repeated word and will abort the recognition process, signalling the speaker to the effect that the command is not recognizing. Worse still, it may cause an undetected misrecognition to occur. Failure will also occur where a word is omitted or spoken in a different order from that stored in the apparatus.

In circumstances where a speaker is under pressure, it may be quite common for spoken commands not to fit the sequence in the recognition apparatus. It is, however, often in these circumstances where it is important for the recognition apparatus to identify the spoken, command the first time it is spoken, so that the command is effected without delay.

BRIEF SUMMARY OF THE INVENTION

It is an object of the present invention to provide speech recognition apparatus and methods which can be used to avoid the above-mentioned disadvantages.

According to one aspect of the present invention there is provided speech recognition apparatus for recognizing a plurality of statements each comprising a plurality of words, the apparatus including store means containing a reference vocabulary of all the words in the statements and means for comparing each word in turn with the reference vocabulary such as to produce a plurality of output signals in respect of the words spoken, the apparatus including processing means containing separate information representing every occurrence of each of the plurality of words in each statement, the processing means being arranged to read in the output signals from the reference vocabulary and to identify them against every occurrence in the processing means of the word associated with the respective output signal, and the processing means being arranged to produce an output signal in accordance with that string of words identified in the processing means which bears the closest resemblance to the spoken statement.

According to another aspect of the present invention there is provided speech recognition apparatus for recognizing a plurality of words, the apparatus including store means containing a reference vocabulary of all the words in the statements to be recognized and means for comparing each word in turn with the reference vocabulary such as to produce a plurality of output signals in respect of the words spoken, the apparatus including processing means including a plurality of groups of storage locations, each group being associated with an individual one of the statements, the storage locations within each group being associated with a respective individual one of the words in the statement, the processing means being arranged to read the output signals in respect of the spoken words into the storage location associated with that word in all the groups having such a storage location such as thereby to identify the storage locations associated with each spoken word, and the processing means being arranged to ascertain which group of storage locations is identified most closely with the spoken statement and produce an output in accordance therewith.

One or more of the groups of storage locations may include two or more locations associated with the same word, those locations associated with the same word preferably being arranged serially so that only one of the locations at a time is identified with the spoken word each time it is spoken.

The processing means may include an output unit that is arranged to receive signals indicative of those storage locations which are not identified with spoken words, and the output unit being arranged to ascertain which group is identified most closely with the spoken statement by ascertaining which group has the fewest storage locations which are not identified with spoken words. The processing means may be arranged to produce an output signal that controls equipment in accordance with spoken command statements.

The apparatus may include feedback means that is arranged to signal to the speaker whether or not the spoken statement has been recognized.

The apparatus preferably includes a microphone that is arranged to supply signals representative of the spoken words to the means for comparing the spoken words with the reference vocabulary.

According to a further aspect of the present invention there is provided a method of recognizing a plurality of spoken statements each comprising a plurality of words, including the steps of comparing each word spoken with stored representations in a reference vocabulary of the words in the plurality of statements, deriving output signals in respect of the words spoken, supplying the output signal to a processing unit containing separate locations representing every occurrence of each of the plurality of words in each statement, identifying each location for each statement corresponding to the spoken word, and providing an output signal representative of the stored statement bearing the closest resemblance to the spoken words.

Speech recognition apparatus, and its methods of operation, in accordance with the present invention will now be described, by way of example, with reference to the accompanying drawings.

DETAILED DESCRIPTION

Figure 1:
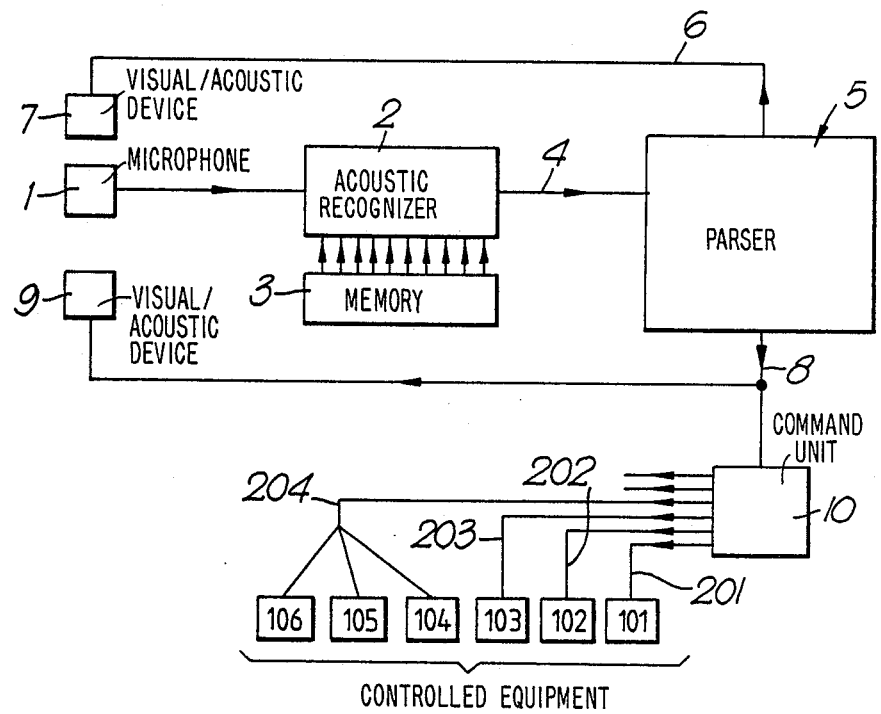
FIG. 1 represents the apparatus schematically.

With reference to FIG. 1, the apparatus includes a microphone 1, or similar device, mounted close to the user, to detect speech sounds made by the user. The microphone 1 supplies electrical signals in accordance with the sound received to an acoustic recognizer 2 which may include filtering and limiting circuits to remove extraneous, non-speech sounds. Associated with the recognizer 2 is a memory 3 containing reference templates of the entire vocabulary of words used in all the commands or other statements for which the apparatus is programmed. The recognizer 2 and memory 3 function in a conventional way, each word in turn as it is spoken being broken up into frequency components which are compared with the reference templates or word model states in the memory. A match occurs when the word and template or word model are similar to within predefined limits. Every time a spoken word is identified, the acoustic recognizer 2 produces an output signal on line 4 coded in respect of that word; this may be a digital or analogue signal.

The line 4 is connected to the input of a processing unit or interactive error correcting grammar parser IECGP 5 the operation of which is described in detail later. The IECGP 5 functions to identify the command spoken from the string of signals identifying the string of recognized words. If it fails to identify the command with sufficient certainty, a feedback signal is supplied via line 6 to a visual or acoustic device 7 which alerts the user to the face that the spoken command, or parts of the spoken command, have not been identified, and prompts the user to repeat the command. Alernatively, if a command has been identified but with only a low certainty, the feedback device 7 may ask for confirmation that the identified command is correct.

When a spoken command is identified with sufficient confidence, the IECGP 5 produces an output signal on line 8 that is supplied both to a second feedback device 9 and to a command unit 10. The feedback device 9 provides confirmation to the user of the instructed command, as identified by the apparatus. The feedback device 9 may be visual or acoustic and may be provided by the same device as the feedback device 7 used to alert the user of failure to recognize the command.

The command unit 10 may be connected directly into a databus and operates to provide a plurality of outputs for controlling the different equipment 101 to 106 for which the commands are given. The outputs may be supplied to the equipment 101 to 103 via separate respective lines 201 to 203. Alternatively, the outputs may be multiplexed and supplied via a single line 204 to different equipment 104 to 106.

Figure 2:
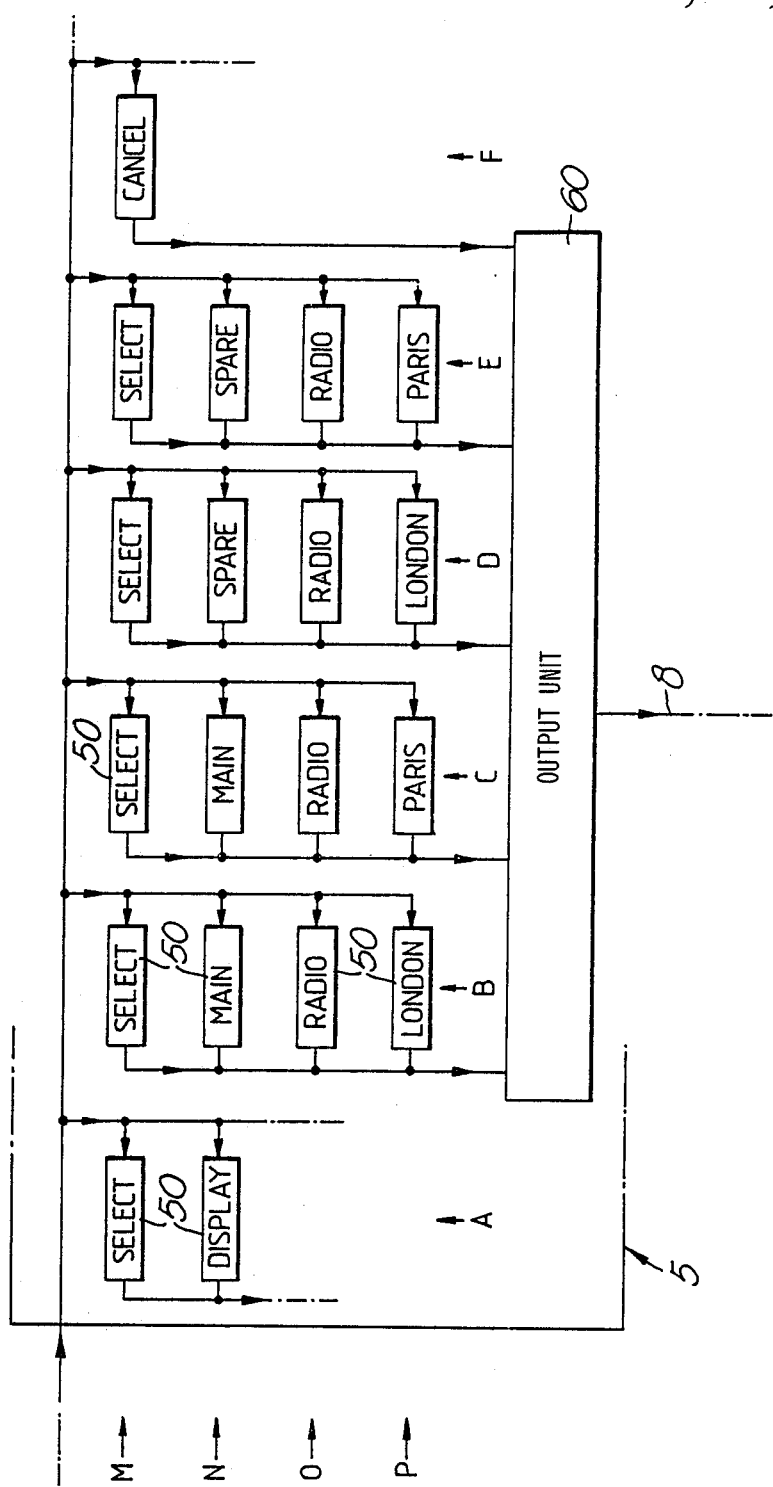
FIG. 2 illustrates schematically the operation of a part of the apparatus.

With reference now to FIG. 2, there is shown a simplified representation of the operation of the IECGP 5. The unit 5 may either be formed by programming of a conventional processing unit or by an assembly of conventional components that will be understood by a worker in this field from the description below.

The unit 5 has a large number of different storage locations 50 within it, each of which is associated with a different word. The storage locations 50 are arranged into several groups, each group being associated with a different one of the spoken statements which can be recognized. In the drawing, these groups are shown as being columns A to F of four locations 50 each, the columns and locations being arranged side-by-side so that the locations of different columns from rows M to P. It will be appreciated, however, that any other configuration of groups of locations could be used. The locations need not be arranged in a two-dimensional configuration as shown and, indeed, the locations in any group need not be located in a physically close group of locations. Because many commands will be similar, different columns will have locations 50 associated with the same words as in other columns, although in no case will two columns have all their locations identified with the same respective words. The columns may differ in length, that is, have different numbers of words making up their respective commands.

In the arrangement of FIG. 2, there are shown five columns which include locations associated with the word 'SELECT'. Four of these columns also include locations associated with the word 'RADIO'. Two of these columns have locations associated with the word 'MAIN' - one also including a location for the word 'LONDON' and one with a location for the word 'PARIS'.

Each of the locations 50 can be addressed at any time regardless of the column in which they are located, or their position along the column. A signal supplied to the unit 5 along line 4 in respect of a word is read into each and every location 50 associated with that word so as to mark or identify that location. Successive words are read into other respective locations in the same way until the end of the spoken command.

Output signals in accordance with whether or not the locations have been identified are supplied to an output unit 60. The output unit 60 computes the number of locations 50 identified in each column A to F and produces an output signal indicating which column corresponds most closely with the spoken command. This output signal is supplied on line 8 as the output of the unit 5. Where columns are of different lengths, the output unit 60 takes this into account when identifying the column most closely corresponding with the spoken command, such as by computing the percentage of identified locations in each column. The locations 50 may be arranged to supply output signals to the output unit 60 when the locations have not been identified by spoken word signals. In this way, a filled column can be identified regardless of length by the lack of any such output signals.

If the user was, for example, to speak the command 'SELECT MAIN RADIO PARIS', the acoustic recognizer 2 would supply output signls to the IECGP 5 in respect of each of the words: SELECT, MAIN, RADIO, PARIS. In the IECGP 5, the signal for the first word 'SELECT' is identified against all the locations associated with that word, namely locations: AM, BM, CM, DM and EM. Similarly, the signal for the next word 'MAIN' causes the locations BN and CN to be identified. The next word 'RADIO' identifies locations BO, CO, DO and EO. The final word 'PARIS' causes locations CP and EP to be identified. The columns A to F, therefore, have the following number of locations identified: A; 1, B: 3, C: 4, D: 2, E: 3 and F: 0. The column with the closest fit to the spoken command is therefore column C, and the output unit 60 produces a coded signal to the command unit 10 in respect of the command associated with column C, namely to select the main radio and tune it to the frequency of the Paris transmitter. The command unit 10 then supplies a suitable signal to turn on the main radio and to tune it accordingly to the desired frequency.

It will be appreciated that the apparatus has the advantage of responding to commands having words spoken in any order, without being confused by repeated words. For example, if the user had instead spoken the command: "SELECT RADIO ... MAIN RADIO PARIS" this would produce the same number of identified locations in each group of locations as with the previous spoken command. Repeated words are simply ignored, unless the command is intended to contain repeated words, in which case a column may have more than one location corresponding to the same word. In such circumstances, the unit 5 would have to be arranged such that a word spoken once does not produce identifications of both locations in the column. This can be achieved by connecting the two locations serially so that one location is only identified after the other location has been identified.

The apparatus and method described above need not be used to identify commands for controlling equipment, but could be used to identify other statements, such as, for example, for storage in some data storage medium.

What I claim is:

1. Speech recognition apparatus for recognizing a plurality of statements each comprising a plurality of spoken words, the apparatus including a store containing a reference vocabulary of all the words in the statements to be recognized, means for supplying speech signals to said apparatus in accordance with the spoken words of a current statement, and a unit that compares each spoken word in said current statement with the reference vocabulary and operates to produce a plurality of output signals representative of said spoken words in said current statement, the apparatus including a processing unit including a plurality of groups of storage locations, each said group being associated with an individual one of the statements, each of the storage locations within each group being associated with a respective individual one of the spoken words in said individual one of said statements, the apparatus including means for supplying said output signals representative of the spoken words into the storage location in the processing unit associated with each of the spoken words in said current statement in all the groups having such a storage location regardless of the order in which each word is spoken in said current statement thereby to mark the storage locations associated with each of the spoken words, and the processing unit including an output unit that ascertains which group of storage locations has the greatest proportion of marked locations and is thereby identified most closely with said current statement.

2. Speech recognition apparatus according to claim 1, wherein at least one of the groups of storage locations includes two or more locations associated with the same word, and wherein those locations associated with the same word are arranged serially within said group so that only one of the locations at a time is marked with the spoken word each time it is spoken.

3. Speech recognition apparatus according to claim 1 wherein the processing unit supplies signals to said output unit indicative of those storage locations which are not marked with spoken words, and wherein the output unit ascertains which group is identified most closely with said current statement by ascertaining which group has the fewest storage locations which are not marked with spoken words.

4. Speech recognition apparatus according to claim 1, wherein the output unit produces an output signal for controlling associated equipment in accordance with spoken command statements.

5. Speech recognition apparatus according to claim 1, wherein the apparatus includes a feedback device that signals to the speaker whether or not said current statement statement has been recognized.

6. Speech recognition apparatus according to claim 1, wherein the said means for supplying speech signals to said apparatus includes a microphone.

7. A method of recognizing a plurality of spoken statements each comprising a plurality of spoken words, comprising the steps of: comparing each spoken word of a current spoken statement with stored representations in a reference vocabulary of the words in the plurality of statements; deriving output signals representative of the spoken words in said current statement; supplying the output signals to a processing unit containing a plurality of groups of separate locations, each group representing a different statement and each storage location representing an individual word in said different statement; marking the storage location associated with each of the output signals representative of the spoken words in said current statement in each and every group having such a storage location regardless of the order in which each of the spoken words in said current statement is spoken; determining which group has the greatest proportion of marked locations; and providing an output signal representative of the statement associated with the determined group.

* * * * *